Aug. 25, 1931.  G. P. PETERSON  1,820,089
SEPARABLE FASTENER
Filed July 8, 1927
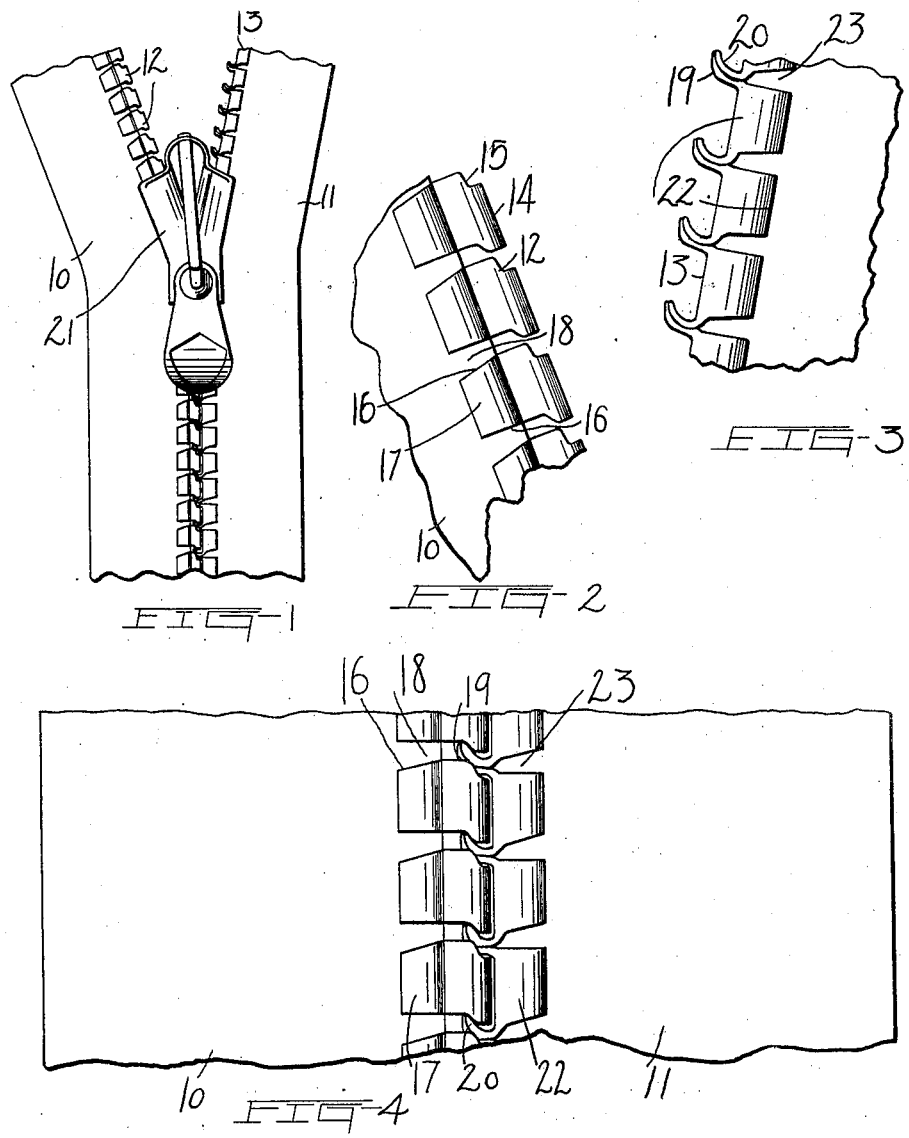
INVENTOR.
Gunnard P. Peterson-
BY Ely & Barrow
ATTORNEYS.

Patented Aug. 25, 1931

1,820,089

UNITED STATES PATENT OFFICE

GUNNARD P. PETERSON, OF NAUGATUCK, CONNECTICUT, ASSIGNOR TO FIRESTONE FOOTWEAR COMPANY, OF HUDSON, MASSACHUSETTS, A CORPORATION OF MASSACHUSETTS

SEPARABLE FASTENER

Application filed July 8, 1927. Serial No. 204,361.

This invention relates to separable fasteners of that type which includes rows of mating or interlocking elements upon the opposite edges of a flexible closure and a slide or cam for operating the elements to or from interlocking engagement.

Particularly it is an object of the invention to provide an improved separable fastener, especially of that type including male elements formed with pairs of spaced prongs or hooks and cooperating female elements providing sockets for receiving the hooks which engage behind an edge wall of the female members, the improvements consisting in so constructing the elements as to permit easier operation of the slide without in any way affecting the security of the fastening, and also so constructing the elements that the fastener will be more highly flexible longitudinally, this being a desirable quality in footwear and other articles where flexing of the fastener occurs in use.

The foregoing and other objects are obtained by the fastener illustrated in the accompanying drawings and described below. It is to be understood that the invention is not limited to the specific form thereof shown and described.

Of the accompanying drawings,

Figure 1 is an elevation of a separable fastener embodying the invention;

Figure 2 is a fragmentary detail elevation of the row of female fastening elements;

Figure 3 is a fragmentary detail elevation of the row of male fastening elements; and Figure 4 is a fragmentary detail elevation of the fastener in mated or interlocked relationship.

Referring to the drawings, the numerals 10 and 11 represent the opposite sides of a flexible closure upon which are clamped female elements 12 on member 10 and male elements 13 on member 11. The elements 12 are substantialy of U-shape in section and are formed with an outer edge wall at 14 cut away at the top at 15 to provide a space or socket between the elements into which the hooks of the male members may project. The top and bottom edges 16, 16 of these elements are cutaway so as to converge away from the edge wall, providing clamping portions 17, 17 of comparatively short length and leaving substantial sections of free, flexible material therebetween at 18, 18 whereby the closure is highly flexible longitudinally thereof.

The elements 13 are formed with upwardly bent, spaced hooks, prongs or hook-like projections 19 and 20, respectively at the top and bottom thereof and projecting in the plane of the closure so as to be easily engageable with the edge walls of members 12, the general angularity of the hooks approximating the angle of divergence of the Y of the usual cam or slider illustrated at 21, rather than being turned downwardly at an equivalent angle opposite to that of the cam Y.

The lower hook 20 of each element is of such size as to overlie and nest in the upper hook 19 of a lower element, the hooks 19 being arranged to extend beyond and in embracing relation to the ends of hooks 20, so that the hooks may move relatively to each other while being flexed without friction or "catching" of the ends of hooks 20 on the cam and so that the ends of the hooks may lie substantially together in order that each pair of hooks 19 and 20 may cooperate as a single male member to enter the spaces or sockets between elements 12. The hooks 19 and 20 converge slightly toward their ends so that the edge walls of elements 12 are engageable between the hooks substantially only at the certain angle at which they are moved together by the cam.

The upper and lower edges of elements 13 are also cutaway so as to converge from the hook portions and define clamping portions 22, 22 of comparatively short length separated by sections 23, 23 of flexible material of considerable width to provide improved longitudinal flexibility.

It will appear from the foregoing that a more flexible and more easily operable fastener of the type set forth has been provided. It will also be apparent that modifications of the invention may be resorted to without departing from the spirit thereof or the scope of the appended claims.

What is claimed is:—

1. In a separable fastener, rows of fastening elements attached to opposite sides of a closure, one of said rows consisting of male members and the other row consisting of socket members, each male member having spaced, slightly convergent, angularly arranged prongs, the upper prong on one male member receiving the lower prong in the next higher male member in nested relationship, said upper prong extending beyond and embracing the end of said lower prong, and each socket member being adapted to receive both of said prongs.

2. In a separable fastener, rows of fastening elements attached to opposite sides of a closure, one of said rows consisting of male members and the other row consisting of socket members, each male member having spaced, slightly convergent prongs, the upper prong on one male member receiving the lower prong in the next higher male member in nested relationship, said upper prong extending beyond and embracing the end of said lower prong, each socket member being adapted to receive both said prongs, and clamping portions on the elements having edges converging away from the interlocking portions thereof to secure the elements in comparatively widely spaced relationship on the edge of a flexible closure.

GUNNARD P. PETERSON.